United States Patent
Oh et al.

(10) Patent No.: US 10,127,646 B2
(45) Date of Patent: Nov. 13, 2018

(54) APPARATUS AND METHOD FOR MEASURING QUALITY OF HOLOGRAPHIC IMAGE

(71) Applicant: ELECTRONICS AND TELECOMMUNICATIONS RESEARCH INSTITUTE, Daejeon (KR)

(72) Inventors: Kwan Jung Oh, Daejeon (KR); Hyon Gon Choo, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/219,426

(22) Filed: Jul. 26, 2016

(65) Prior Publication Data
US 2017/0148151 A1  May 25, 2017

(30) Foreign Application Priority Data
Nov. 25, 2015  (KR) .................. 10-2015-0165228

(51) Int. Cl.
*G06K 9/00* (2006.01)
*G06T 7/00* (2017.01)
(Continued)

(52) U.S. Cl.
CPC ......... *G06T 7/0002* (2013.01); *G03H 1/2249* (2013.01); *G06T 19/20* (2013.01);
(Continued)

(58) Field of Classification Search
CPC .... G06T 7/0002; G06T 19/20; G06T 2219/2004
See application file for complete search history.

(56) References Cited

U.S. PATENT DOCUMENTS 6,014,219 A * 1/2000 Yamate .................... G03H 1/00
356/394
6,631,403 B1 * 10/2003 Deutsch ............ G06F 17/30017
348/E5.006
(Continued)

FOREIGN PATENT DOCUMENTS

KR  10-2013-0060978  6/2013
KR  10-2015-0081010  7/2015

OTHER PUBLICATIONS

Alison E. Shortt et al., "Combined nonuniform quantization and lossless coding of digital holograms of three-dimensional objects"; Proceedings of SPIE vol. 5243 Three-Dimensional TV, Video, and Display II, edited by Bahram Javidi, Fumio Okano (SPIE, Bellingham, WA, 2003), pp. 81-88.
(Continued)

*Primary Examiner* — Chan Park
*Assistant Examiner* — Elisa Rice
(74) *Attorney, Agent, or Firm* — Kile Park Reed & Houtteman PLLC (57) ABSTRACT

Provided is an apparatus for measuring a quality of a holographic image. The apparatus includes: a hologram image reconstruction unit configured to perform a hologram image; a superimposed focus image generation unit configured to collect an area that is in focus from reconstructed images and superimpose into a single image; and a hologram image quality measurement unit configured to perform an image quality evaluation for the superimposed focus image.

13 Claims, 7 Drawing Sheets

(51) Int. Cl.
    *G06T 19/20* (2011.01)
    *G03H 1/22* (2006.01)
(52) U.S. Cl.
    CPC . *G03H 2001/2247* (2013.01); *G03H 2210/30* (2013.01); *G06T 2219/2004* (2013.01)

(56) References Cited

U.S. PATENT DOCUMENTS

| | | | | |
|---|---|---|---|---|
| 2005/0169555 | A1* | 8/2005 | Hasegawa | H04N 1/3876 382/284 |
| 2006/0209370 | A1* | 9/2006 | Coppola | G03H 1/0866 359/9 |
| 2008/0018966 | A1* | 1/2008 | Dubois | G01B 9/021 359/9 |
| 2008/0316300 | A1* | 12/2008 | Okamoto | H04N 5/2258 348/47 |
| 2011/0141289 | A1 | 6/2011 | Lee et al. | |
| 2011/0310447 | A1* | 12/2011 | Kim | G03H 1/0808 359/9 |
| 2015/0009357 | A1* | 1/2015 | Seibel | A61B 1/07 348/222.1 |
| 2015/0192898 | A1 | 7/2015 | Nam et al. | |
| 2016/0040983 | A1* | 2/2016 | Lee | G01B 11/026 356/601 |

OTHER PUBLICATIONS

Li-Chien Lin et al., "Adaptive reconstruction algorithm for reducing transmission errors on digital holograms"; Optical Engineering 47(1), 015801 (Jan. 2008), pp. 1-5.

Young-Ho Seo et al., "3D scanning-based compression technique for digital hologram video"; Signal Processing: Image Communication 22 (2007), pp. 144-156.

* cited by examiner

APPARATUS AND METHOD FOR MEASURING QUALITY OF HOLOGRAPHIC IMAGE

CROSS-REFERENCE TO RELATED APPLICATION

This application claims the benefit of priority to Korean Patent Application No. 2015-00165228, filed on Nov. 25, 2015 in the Korean Intellectual Property Office, the disclosure of which is incorporated herein in its entirety by reference.

BACKGROUND OF THE INVENTION

Field of the Invention

The present disclosure relates to an apparatus and a method for measuring the quality of a holographic image, and more particularly, to a technology that can measure the quality of a holographic image by generating the holographic image to be a single superimposed focus image.

Description of the Related Art

Holography is a technology that uses diffraction and interference of light and a technology that can provide a complete 3D image like a real image by utilizing both amplitude and phase information in comparison with the existing 2D image that records only amplitude information of light such that it has been highlighted as an ultimate imaging technology.

Accordingly, a research on various holographic video systems that can service the holographic image is actively progressed. Various researches, such as a research on the apparatus and the method of obtaining and generating a graphic data, a research on the codec technology of the compression and transmission and the decoding of the data, and a research on the holographic display apparatus that can play the data, are progressed.

The quality measurement for an image is the most important technology element in a digital image processing, because the performance of a digital image processing algorithm can be evaluated through the quality measurement, and, through this, the optimization of the image processing algorithm is possible.

Usually, the quality measurement on the digital image is divided into a subjective method and an objective method. The subjective method is accomplished in such a way that a person observes an image played through an actual display device with an eye and gives a score. On the other hand, the objective method is accomplished by comparing values numerically through evaluation metric/measurement. In general, the peak signal to noise ratio (PSNR) is a representative object quality assessment criterion in a 2D image.

Since the holographic image can express several depth planes and several viewpoints simultaneously, a separate quality evaluation method for this is required.

SUMMARY OF THE INVENTION

The present disclosure has been made in view of the above problems, and provides an apparatus and a method for measuring the quality of a holographic image capable of performing objective and subjective quality assessments for a holographic image.

In accordance with an aspect of the present disclosure, an apparatus for measuring a quality of a holographic image includes: a hologram image reconstruction unit configured to reconstruct a hologram image; a superimposed focus image generation unit configured to collect an area that is in focus from reconstructed images and superimpose into a single image; and a hologram image quality measurement unit configured to perform an image quality evaluation for the superimposed focus image. The apparatus further includes a hologram image generation unit configured to generate a hologram image by using a three-dimensional image. The hologram image reconstruction unit performs a numerical reconstruction for each depth. The superimposed focus image generation unit collects an area which is in focus by using a depth image. The superimposed focus image generation unit generates a superimposed focus image with respect to all depth planes or a depth plane having representativeness. The superimposed focus image generation unit generates a superimposed focus image by using a defocusing for a reconstructed image for each depth or by analyzing a correlation for the same area for each depth. The reconstructed image for each depth is corrected to have the same intensity for each depth when the image is reconstructed by the hologram image reconstruction unit, or is post-corrected to have the same intensity after the reconstruction is completed, or is corrected when the image is superimposed by the superimposed focus image generation unit. The hologram image quality measurement unit measures a quality, a sense of depth, and a view angle of the superimposed focus image.

The hologram image quality measurement unit defines a viewpoint having representativeness for the superimposed focus image and evaluates a quality of the viewpoint having representativeness. The hologram image quality measurement unit generates a single panorama image by using an image of various viewpoints for the superimposed focus image and evaluates a quality of the panoramic image.

In accordance with another aspect of the present disclosure, a method for measuring a quality of a holographic image includes: performing a reconstruction for each depth of a hologram image; collecting an area that is in focus from the reconstructed images and generating a single superimposed focus image; and measuring a quality of the single superimposed focus image. Performing a reconstruction for each depth includes performing a numerical reconstruction for each depth. The method further includes generating the hologram image from a three-dimensional image. Generating a single superimposed focus image includes collecting an area which is in focus at a certain depth by using a depth image and generating the single superimposed focus image. Measuring a quality of the single superimposed focus image includes evaluating a quality, a sense of depth, and a view angle of the single superimposed focus image. Measuring a quality of the single superimposed focus image includes defining a viewpoint having representativeness for the single superimposed focus image and evaluating a quality of the viewpoint having representativeness.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Hereinafter, embodiments of the present disclosure are described in detail with reference to FIG. 1 to FIG. 7.

Figure 1:
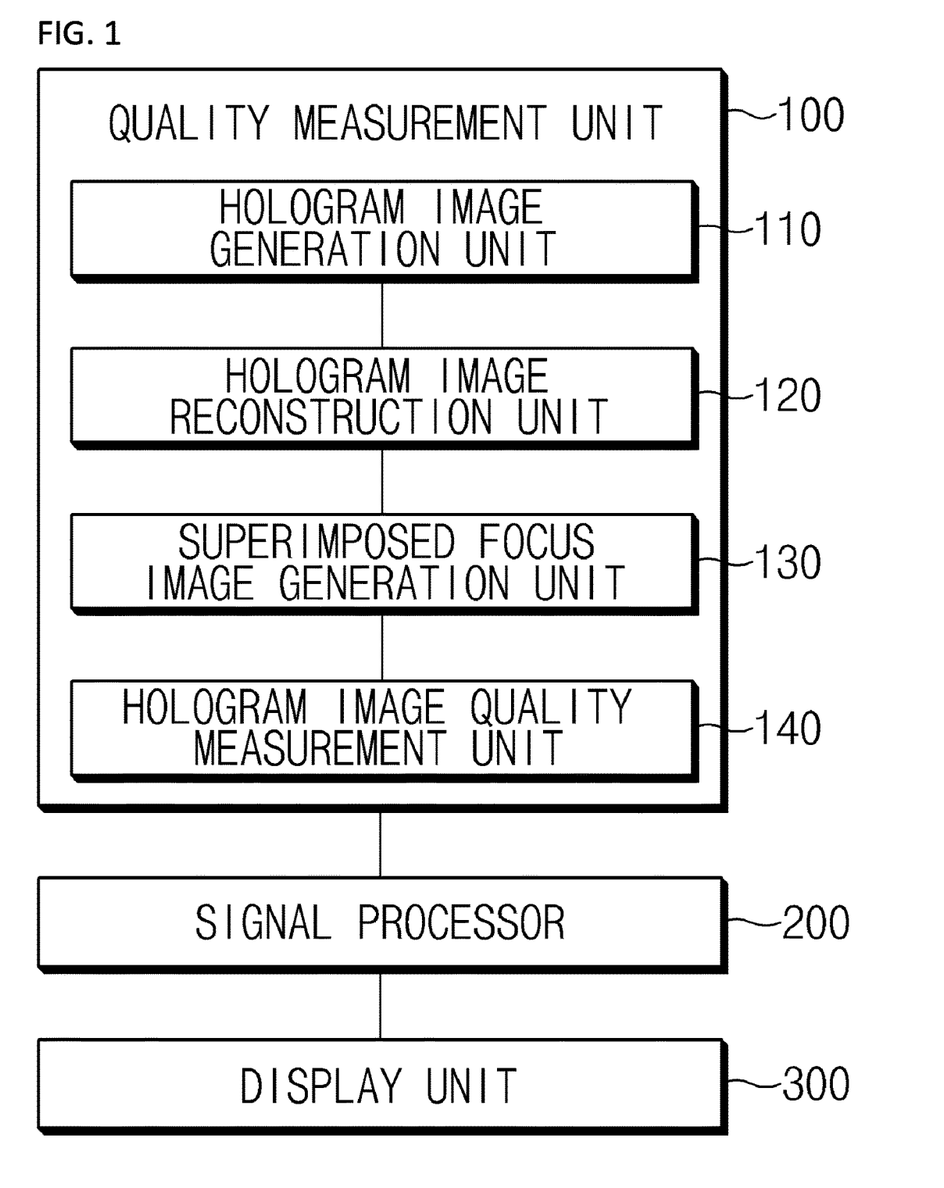
FIG. 1 is a diagram illustrating a configuration of an apparatus for measuring a quality of a holographic image according to an embodiment of the present disclosure.

FIG. 1 is a diagram illustrating a configuration of an apparatus for measuring a quality of a holographic image according to an embodiment of the present disclosure. A holographic image of the present disclosure means a 3D data that can be converted to a hologram image, and means a directly obtained hologram data, a hologram image, a hologram obtained through computer generated hologram (CGH), and a 3D image or a 3D model data that can be converted to a hologram through CGH. The present disclosure is described based on a hologram image and a 3D video image which are a representative holographic image.

In a three-dimensional video service based on multiple viewpoints three-dimensional image, the evaluation of three-dimensional image is accomplished by evaluating not only the quality itself of the three-dimensional image but also the quality of the image of the middle viewpoint which can be rendered through it. That is, from the point of view of the codec, the quality of the image of a virtual viewpoint is also evaluated in addition to the input viewpoint. This is to prevent the image quality of the middle viewpoint which is necessary for a real service from being deteriorated as the processing for the multiple viewpoints three-dimensional image is optimized only at a given viewpoint, which is considered even when the quality of the holographic image is evaluated.

In the case of the hologram image, unlike conventional two-dimensional and three-dimensional images, the hologram image is not an image which is sensed by eyes when a corresponding image is directly displayed on eyes, but a data which is loaded to a spatial light modulator (SLM), and the quality of the hologram displayed through the spatial light modulator is important rather than the quality of the image itself. That is, the image quality of the 3D image coded to show is an image directly displayed on the eye through a two-dimensional or three-dimensional display device, but the image quality of the 3D image during the display of the holographic image is just only three-dimensional image information for making a hologram image.

Thus, the present disclosure performs the image quality evaluation for the displayed holographic image not for the three-dimensional image itself.

To this end, the apparatus for measuring a quality of a holographic image according to an embodiment of the present disclosure may include a quality measurement unit 100, a signal processor 200, and a display unit 300.

The quality measurement unit 100 may numerically reconstruct the hologram image and generate a superimposed focus image from the numerically reconstructed image to measure the quality based on the superimposed focus image.

The quality measurement unit 100 may include a hologram image generation unit 110, a hologram image reconstruction unit 120, a superimposed focus image generation unit 130, and a hologram image quality measurement unit 140.

The hologram image generation unit 110 may generate a hologram image from a three-dimensional image having color and depth.

Figure 5:
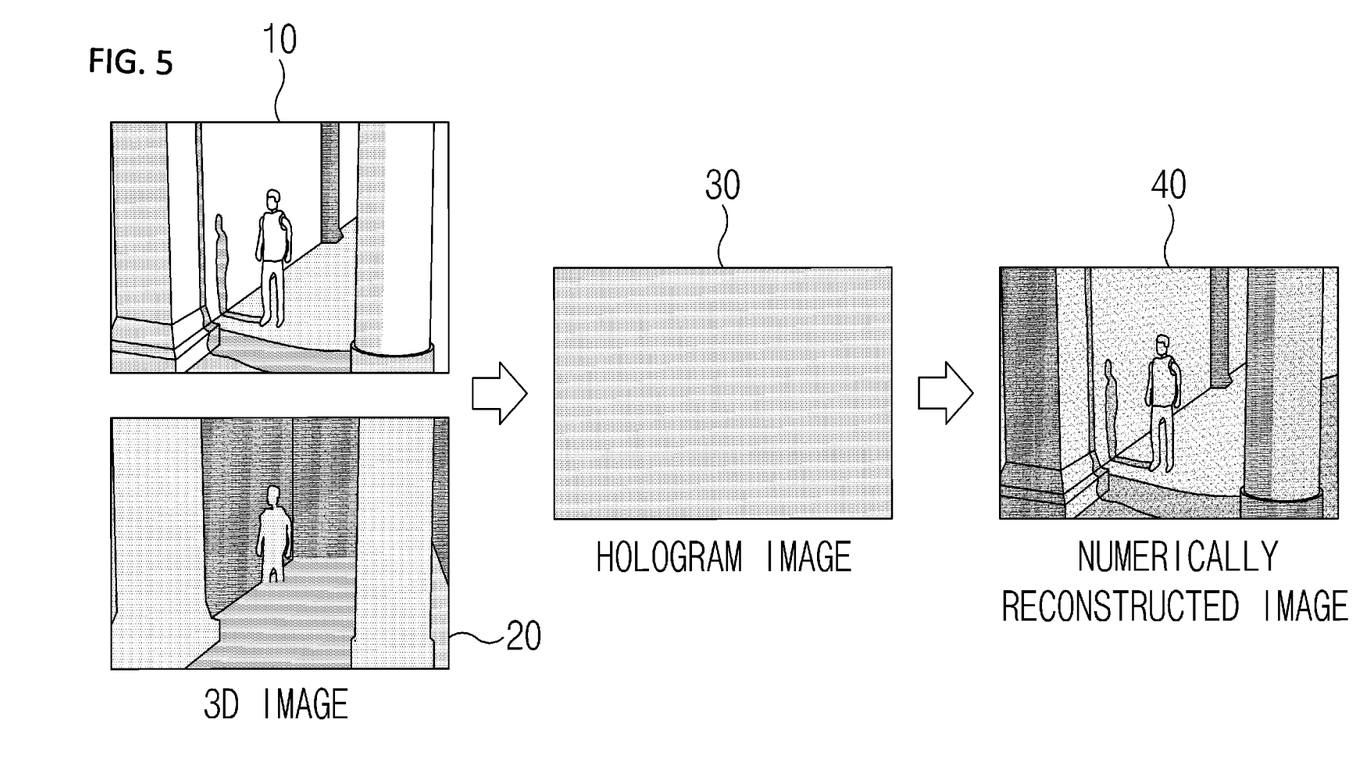
FIG. 5 is a diagram illustrating a numerically reconstructed image generation process according to an embodiment of the present disclosure.

The hologram image reconstruction unit 120 may perform the numerical reconstruction for all depth planes of the holographic image. Unlike the conventional two-dimensional image, a depth of the hologram image can be expressed so that a specific depth may be focused on as if a person actually sees with eyes. Thus, the numerical reconstruction for the hologram image means the reconstruction of the image focused on a specific depth plane. The numerical reconstruction image may be defined for each depth plane. In order to evaluate the numerically reconstructed hologram image, the numerical reconstruction should be performed for all depth planes and all images on this should be evaluated. For example, when the depth image is a 8-bit image having 256 levels, 256 depth planes are defined and 256 numerical reconstruction images are generated. FIG. 5 shows an image 40 that performed a numerical reconstruction of the hologram image after generating a hologram image 30 from three-dimensional images 10, 20.

Figure 6:
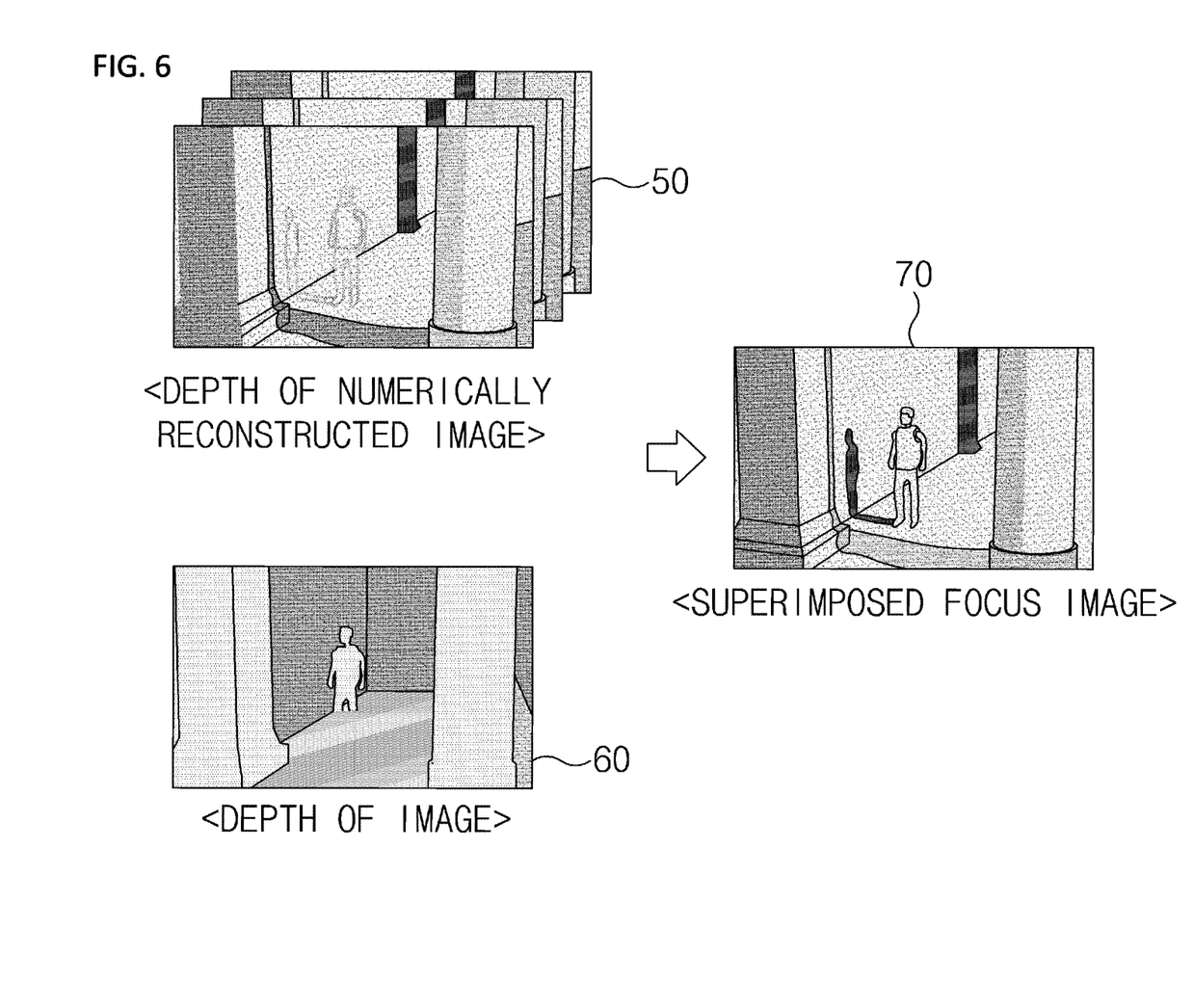
FIG. 6 is a diagram illustrating a process of generating a superimposed focus image from a reconstructed image for each depth according to an embodiment of the present disclosure.

The superimposed focus image generation unit 130 may generate a single superimposed focus image by collecting only the areas that are in focus from a corresponding depth in the numerically reconstructed image for each depth and superimposing into a single image to generate a single superimposed focus image. When the previously illustrated 256 numerically reconstructed images are generated, since it is difficult to evaluate the quality of all of the 256 numerically reconstructed images, a single superimposed focus image is generated by collecting only the areas that are in focus from the 256 numerically reconstructed images. FIG. 6 illustrates that a superimposed focus image 70 is created by collecting only the areas that are in focus from a specific depth several numerically reconstructed image for each depth 50. At this time, the areas that are in focus at a specific depth may be classified by using an original depth image 60.

For example, if a specific object has a depth value of 100, only a corresponding object area may be fetched from the numerically reconstructed area in the 100-th depth. This utilizes a characteristic that a person focusing on a specific depth is somewhat insensitive for other depth area. If the depth image is not available, a superimposed focus image may be created through a processing such as a signal processing using a de-focusing for the reconstructed image for each depth or a method of analyzing the correlation for the same area for each depth. Further, during the generation of superimposed focus image, all depth planes may be utilized or may be performed only for a depth plane having representativeness. The difference of the brightness of the reconstructed image for each depth used during the generation of superimposed focus image, may be adjusted to have the same brightness in the reconstruction process, or may be post-corrected to have the same brightness after the reconstruction. Alternatively, it may be corrected in the process of superimposing the image.

The hologram image quality measurement unit 140 may perform the image quality evaluation for a single superimposed focus image generated in the superimposed focus image generation unit 130. Thus, both of the quality and the sense of depth for the hologram image of a corresponding viewpoint may be evaluated only by evaluating a single superimposed focus image.

The hologram image quality measurement unit 140 may compare the superimposed focus image generated from the lossless holographic data with the superimposed focus image generated from the holographic data which has a loss through a certain signal processing by using a two-dimensional image quality evaluation metric to measure the quality deterioration of the processing that caused the loss.

The signal processor 200 may perform the signal processing of the holographic image by using the measured quality value.

The display unit 300 may display the signal preset depth processed holographic image. At this time, the display unit 300 may implement the superimposed focus image generated from the holographic image as a two-dimensional or three-dimensional display.

It is illustrated that the apparatus for measuring a quality of a holographic image having such a configuration evaluates the quality and the sense of depth for the hologram image.

However, in this case, when the viewing angle of the hologram image is wide, the evaluation for the viewing angle should be added. The concept of another expression of the viewing angle may be similar to the number of the watchable viewpoints. In other words, that a certain hologram image has a viewing angle of 20 degrees means that the image can be watched for any viewpoints within 20 degrees. Therefore, when evaluating the hologram image, the evaluation of the viewing angle also should be considered as well as the quality and the sense of depth.

Therefore, in order to evaluate the viewing angle, the superimposed focus image generation unit 130 may generate the superimposed focus image for a specific viewpoint within a corresponding viewing angle, and the hologram image quality measurement unit 140 may evaluate the image quality for the superimposed focus image for a specific viewpoint. Since the image cannot be evaluated for an infinite viewpoint, the image evaluation may be simplified through a definition for a representative viewpoint within the viewing angle. For example, if the image evaluation is performed with respect to the leftmost viewpoint, the center viewpoint, and the rightmost viewpoint, a representativeness for all viewpoints within a corresponding viewing angle may be secured to a certain degree. Alternatively, a single panorama image may be generated by using the images of various viewpoints to evaluate the image quality through the panorama image.

That is, the image of the viewpoint having representativeness may be represented by the image of one or a plurality of viewpoints, or may be a panorama image in the form of integrating the images of multiple viewpoints into a single image.

Accordingly, the present disclosure may evaluate the image quality of the hologram images by defining a superimposed focus image and defining a viewpoint(s) having representativeness.

If the generation of the hologram and the numerical reconstruction process are an ideal process having no loss, the superimposed image of FIG. 6 is identical with color image information of the three-dimensional image of FIG. 5. This means that the original three-dimensional image also may be used in image quality evaluation method using the superimposed image. The superimposed focus image generated for the multiple viewpoints may have a form like a multiple viewpoints image. Therefore, in the case in which the holographic display cannot be generally utilized in the method of evaluating the quality for the hologram image, the superimposed focus images of multiple viewpoints may be displayed through the existing stereo or multiple viewpoints display, so that an effect similar to the subjective quality evaluation for the holographic display may be obtained.

When the evaluation method for the hologram image quality is defined as described above, it is possible to perform more useful hologram image quality evaluation, and further, based on this, it is also possible to optimize various signal processing processes for the digital graphic data. For example, when performing a rate-distortion optimization during the process of compressing a digital holographic data, if considering a holographic image service, it would be more useful if the evaluation for the hologram image quality is considered in the distortion. In addition, the pre-processing/post-processing/in-loop filtering or down/up sampling process for the holographic data, the processing based on iteration, and the like may be optimized from the point of view of hologram quality evaluation.

Figure 2:
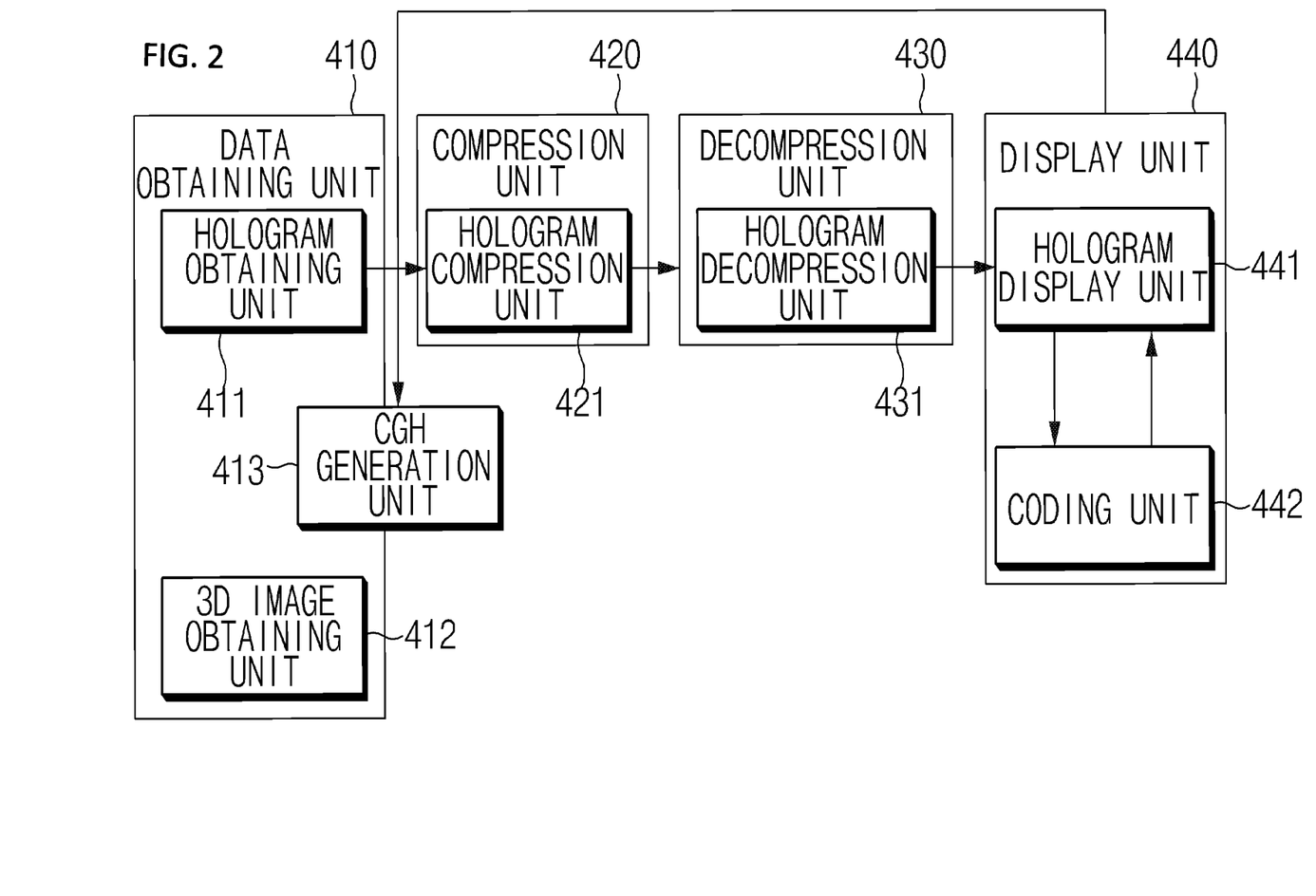
FIG. 2 is a diagram illustrating a configuration of a hologram-based holographic video system implementing a method for measuring a quality of a holographic image according to an embodiment of the present disclosure.

FIG. 2 is a diagram illustrating a configuration of a hologram-based holographic video system implementing a method for measuring a quality of a holographic image according to an embodiment of the present disclosure.

Referring to FIG. 2, the hologram-based holographic video system may include a data obtaining unit 410, a compression unit 420, a decompression unit 430, and a display unit 440.

A hologram obtaining unit 411 in the data obtaining unit 410 may obtain a hologram image and a 3D image obtaining unit 412 may obtain a 3D image. In this case, a CGH generation unit 413 may convert the 3D image into a hologram image.

Thus, the compression unit 420 may compress the hologram image of the hologram obtaining unit 411 and the hologram image generated by the CGH generation unit 413, and transmit the compressed image through broadcasting, network, storage, and the like.

The decompression unit 430 may decompress the received compressed image to transmit to the display unit 440. At this time, the compression and decompression technology of a general video system may be used for the compression and the decompression of the image data.

The display unit 440 may display a compressed hologram image received from the decompression unit 430. In this case, the image may be displayed after coding the compression data through a coding unit 442.

Thus, in FIG. 2, when a hologram image is generated by using a 3D image and the hologram image is compressed to transmit, a receiving end may decompress the compressed hologram image and the display unit may display the decompressed hologram image, and the present disclosure may measure the quality of the hologram image.

Figure 3:
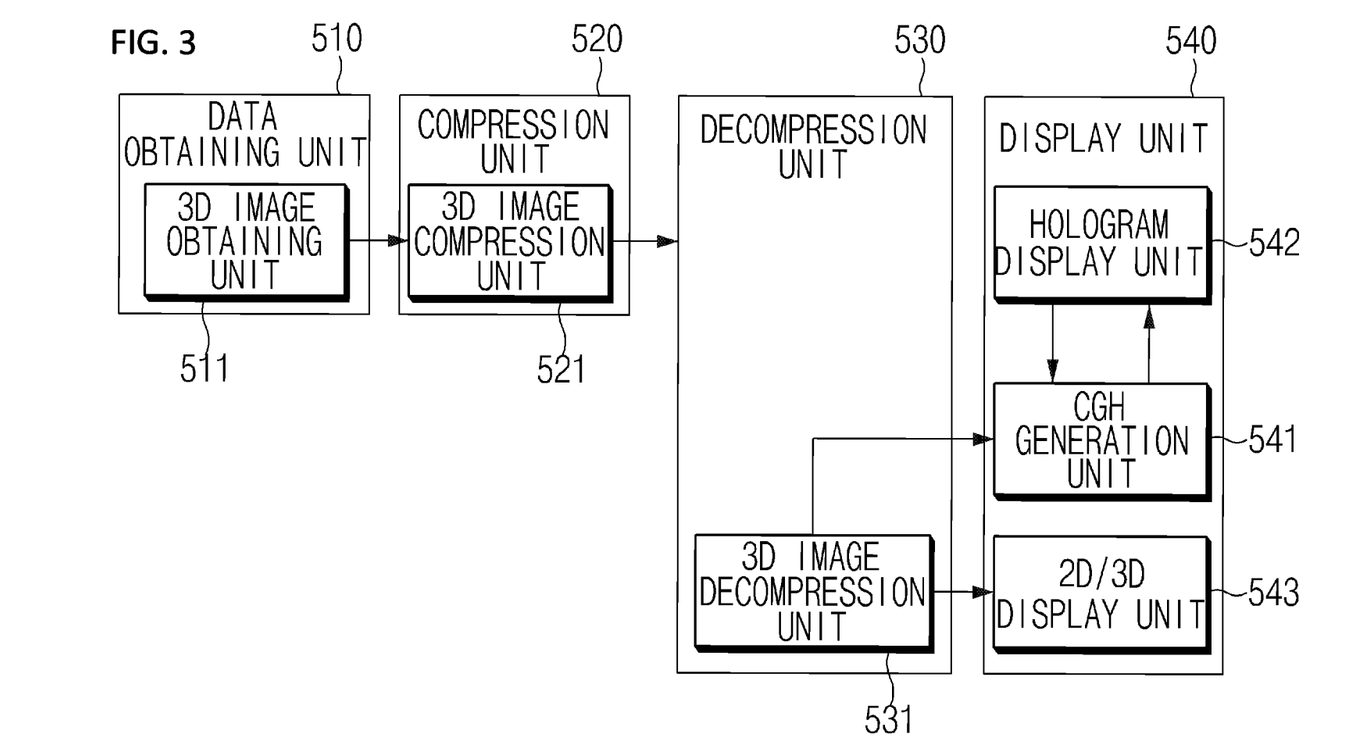
FIG. 3 is a diagram illustrating a configuration of a 3-D image-based holographic video system implementing a method for measuring a quality of a holographic image according to an embodiment of the present disclosure.

FIG. 3 is a diagram illustrating a configuration of a 3-D image-based holographic video system implementing a method for measuring a quality of a holographic image according to an embodiment of the present disclosure.

In the 3-D image-based holographic video system shown in FIG. 3, when a data obtaining unit 510 obtains a three-dimensional image and a compression unit 520 compresses the three-dimensional image to transmit, a decompression unit 530 in the receiving end may decompress the three-dimensional image to transmit to a display unit 540.

A CGH generation unit 541 of the display unit 540 may convert the decompressed three-dimensional image into a hologram to send to a hologram display unit 542 and the hologram display unit 542 may display the hologram image. Meanwhile, a 2D/3D display unit 543 may immediately display the decompressed 3-D image.

Thus, in FIG. 3, when a 3-D image is compressed and transmitted, a receiving end may decompress the compressed 3-D image and the CGH generation unit 541 may convert the decompressed 3-D image into a hologram image to display the converted hologram image, and the present disclosure may measure the quality of the hologram image. Hereinafter, the method for measuring a quality of a holographic image according to an embodiment of the present disclosure is described in detail with reference to FIG. 4.

Figure 4:
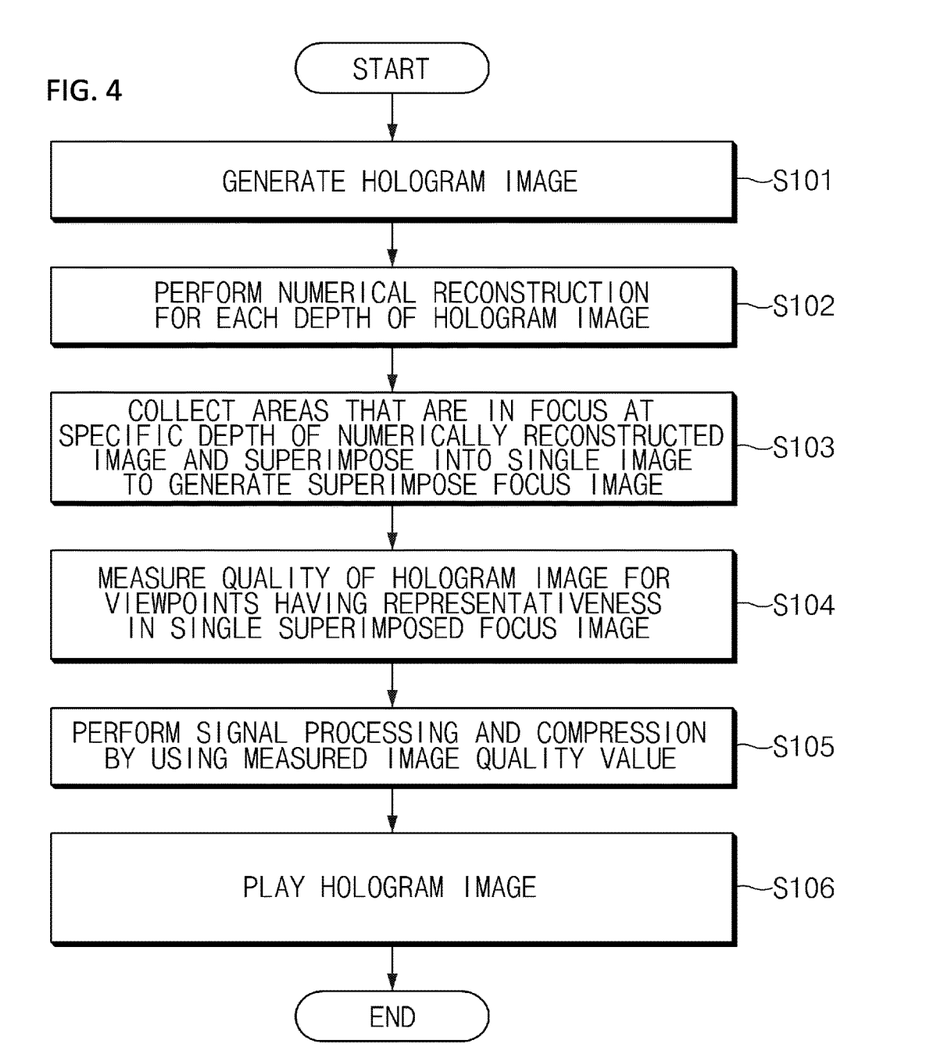
FIG. 4 is a flowchart illustrating a method for measuring a quality of a holographic image according to an embodiment of the present disclosure.

The hologram image generation unit 110 may generate a hologram image from a three-dimensional image (S101). At this time, it may also be able to use a hologram image itself without generating a hologram image from the three-dimensional image.

Then, the hologram image reconstruction unit 120 may perform a numerical reconstruction for each depth of hologram image (S102). That is, the hologram image reconstruction unit 120 may perform the reconstruction of the image focused on a specific depth plane of the hologram image.

Then, the superimposed focus image generation unit 130 may collect the areas that are in focus at a specific depth of the numerically reconstructed image and superimpose into a single image to generate a superimpose focus image (S103). At this time, the superimposed focus image generation unit 130 may generate a superimpose focus image for a specific viewpoint within a specific viewing angle, when considering the viewing angle.

Then, the hologram image quality measurement unit 140 may measure the quality of the hologram image for the viewpoints having representativeness in a single superimposed focus image (S104). Then, the signal processor 200 may perform the signal processing and the compression by using the measured image quality value (S105).

Then, the display unit 300 may play the single superimposed focus image by the 2D or 3D display unit (S106).

Figure 7:
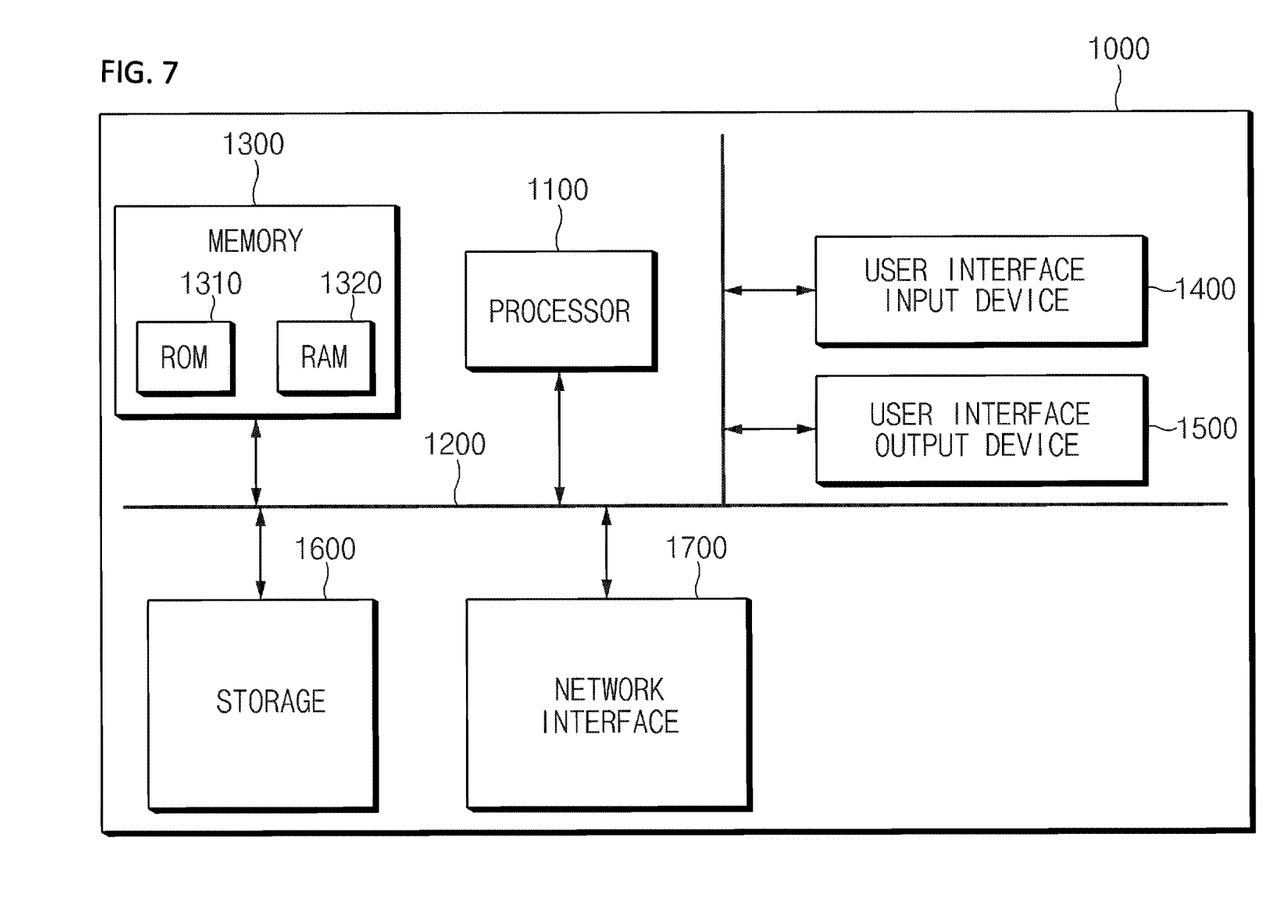
FIG. 7 is a block diagram illustrating a configuration of a computer system implementing a holographic image quality measurement technology according to an embodiment of the present disclosure.

FIG. 7 is a block diagram illustrating a configuration of a computer system implementing a holographic image quality measurement technology according to an embodiment of the present disclosure.

Referring to FIG. 7, a computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) 1310 and a Random Access Memory (RAM) 1320.

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM.

The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

When the above described method is applied, the present technology is able to perform the objective and the subjective quality evaluations and, based on this, is able to perform the optimization from a signal processing point of view.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for measuring a quality of a holographic image, the apparatus comprising:
   a hologram image reconstruction unit configured to perform a reconstruction for a hologram image on a three-dimensional space by using a three-dimensional image;
   a superimposed focus image generation unit configured to collect areas that are in focus at each depth of the hologram image and generate a superimposed focus image including the collected areas; and
   a hologram image quality measurement unit configured to generate a single representative image by integrating plurality of viewpoint images for the superimposed focus image within a viewing angle, and evaluate quality of the single representative image.

2. The apparatus of claim 1, wherein the hologram image reconstruction unit performs a numerical reconstruction within the three-dimensional space of the hologram image.

3. The apparatus of claim 1, wherein the superimposed focus image generation unit collects the areas that are in focus at a certain depth.

4. The apparatus of claim 1, wherein the superimposed focus image generation unit generates the superimposed focus image with respect to the three-dimensional space of the hologram image.

5. The apparatus of claim 2, wherein the superimposed focus image generation unit generates the superimposed focus image by using a defocusing for a reconstructed image for each depth or by analyzing a correlation for the same area for each depth.

6. The apparatus of claim 5, wherein the reconstructed image for each depth is corrected to have the same brightness for each depth when the image is reconstructed by the hologram image reconstruction unit, or is post-corrected to have the same brightness after the reconstruction is completed, or is corrected when the image is superimposed by the superimposed focus image generation unit.

7. The apparatus of claim 1, wherein the hologram image quality measurement unit evaluates a quality, a sense of depth, and a view angle of the single representative image.

8. The apparatus of claim 1, wherein the hologram image quality measurement unit defines a viewpoint having representativeness for the single representative image and evaluates a quality of the viewpoint having representativeness.

9. A method for measuring a quality of a holographic image, the method comprising:
    performing a reconstruction for a hologram image on a three-dimensional space by using a three-dimensional image;
    collecting areas that are in focus from at each depth of the hologram image and superimposing the collected areas into a superimposed focus image; and
    generate a single representative image by integrating plurality of viewpoint images for the superimposed focus image within a viewing angle, and
    evaluating quality of the single representative image.

10. The method of claim 9, wherein performing a reconstruction for each depth comprises performing a numerical reconstruction within the three-dimensional spare of the hologram image.

11. The method of claim 9, wherein collecting areas comprises collecting the areas that are in focus at a certain depth.

12. The method of claim 9, wherein evaluating comprises evaluating a quality, a sense of depth, and a view angle of the single representative image.

13. The method of claim 9, wherein evaluating comprises defining a viewpoint image among the plurality of viewpoint images having representativeness for the single representative image and evaluating a quality of the viewpoint image having representativeness.

* * * * *